United States Patent [19]

Shikada

[11] 3,714,307

[45] Jan. 30, 1973

[54] AQUEOUS COAGULATION OF SALT CONTAINING POLYURETHANE TO FORM POROUS SHEET

[75] Inventor: Tatsunori Shikada, Miyakojima-ku, Osaka, Japan

[73] Assignee: Kanegafuchi Boseki Kabushiki Kaisha

[22] Filed: Feb. 24, 1971

[21] Appl. No.: 118,530

Related U.S. Application Data

[63] Continuation of Ser. No. 728,058, May 9, 1968, abandoned.

[52] U.S. Cl. .................. 264/49, 117/63, 117/135.5, 260/2.5 AY, 264/41, 161/160, 161/190
[51] Int. Cl. ............................................B29d 27/04
[58] Field of Search .........117/63, 135.5; 264/49, 41; 260/2.5 AY

[56] References Cited

UNITED STATES PATENTS

| | | | |
|---|---|---|---|
| 3,486,968 | 12/1969 | Mater | 260/2.5 AY |
| 3,424,604 | 1/1969 | Fukushima | 260/2.5 AY |
| 3,348,963 | 10/1967 | Fukushima | 264/41 UX |
| 3,100,721 | 8/1963 | Holden | 264/41 X |
| 3,540,916 | 11/1970 | Fukada | 117/135.5 X |
| 3,348,963 | 10/1967 | Fukushima | 264/41 UX |
| 3,379,658 | 4/1968 | Kemper | 264/49 UX |
| 3,424,604 | 1/1969 | Fukushima | 260/77.5 MP UX |
| 3,486,968 | 12/1969 | Mater | 260/2.5 AY UX |
| 2,383,110 | 8/1945 | Cooper | 264/54 |
| 2,983,960 | 5/1961 | Jilge | 264/49 X |
| 2,984,869 | 5/1961 | O'Conor Honey et al. | 264/49 |
| 3,100,721 | 8/1963 | Holden | 264/41 UX |
| 3,235,634 | 2/1966 | Michel | 264/49 |
| 3,266,966 | 8/1966 | Patchell | 264/49 X |
| 3,418,168 | 12/1968 | Wentworth | 264/49 X |

Primary Examiner—Donald J. Arnold
Assistant Examiner—Paul A. Leipold
Attorney—Harry C. Bierman et al.

[57] ABSTRACT

The process for producing a porous sheet material comprises the steps of applying a coating solution to at least one surface of a fibrous base or a film-making plate to form a coating layer. The coating layer is then coagulated and regenerated. The coating solution contains a water-miscible organic solvent, a polyurethane polyester and at least one inorganic salt. The aqueous medium comprises an aqueous solution of said inorganic salt in a concentration of below about two thirds its concentration at saturation and at least sufficient to yield a porous sheet. The coating solution comprises 10 to 50 parts by weight of inorganic salt in 100 parts by weight of a film forming polyester type polyurethane.

4 Claims, No Drawings

AQUEOUS COAGULATION OF SALT CONTAINING POLYURETHANE TO FORM POROUS SHEET

This application is a continuation of application Ser. No. 728,058 filed May 9, 1968 and now abandoned.

This invention relates to an improved process for producing a sheet material having a porous structure and useful for synthetic leathers.

An object of the present invention is to provide a process for producing a porous sheet material of a polymer consisting of or mainly of a polyurethane, which is light and high in the softness and moisture-permeability.

There are already known some processes for producing porous sheet materials, e.g. (a) a process wherein micro holes or pores are mechanically made in a film, (b) a process wherein a certain component is extracted out of a polymer film to form micro-pores, (c) a process wherein a latex of a synthetic resin or synthetic rubber is coagulated and (d) a process wherein a foaming agent is incorporated in a film. However, in any of these processes, there are many difficulties in producing satisfactory porous sheets when a polyurethane is used as a film forming polymer. For example, it is difficult to form a film of a foamed polyurethane as applied to a base or as alone without using a base. Particularly, when there are required such physical properties (adapted to synthetic leathers) as toughness, moisture-permeability, low and high temperature resistance, the above mentioned processes would be more difficult to industrially put into practice.

In order to obtain a porous sheet which is light and is high in the moisture-permeability and softness, it is necessary to form in a uniform state micro-pores for giving a moisture-permeability as well as large pores for imparting satisfactory softness and high porosity to the polymer sheet material.

In this respect, in Belgian Patent No. 636,018, there is mentioned a process for producing a porous sheet in which a honeycomb-shaped porous layer is formed by coating at least one surface of a fibrous sheet material with a polyurethane solution and coagulating the solution with such nonsolvent as water so that large pores may be partitioned from each other with a wall of fine pores.

However, in such process, as admitted in the patent, a strict control is necessary under various conditions such as ratio of the solvent to the nonsolvent, the viscosity of the coating solution, humidity and temperature under which the formation of the film is conducted. Therefore, it seems that there are difficulties in industrially carrying out the said process. For example, there is a difficulty that, if water is used for the coagulating bath as mentioned in the example given in the patent, the surface layer of the film will come into contact with water and will quickly coagulate to form a compact structure therein, so that the further penetration of water into the interior of the film will be delayed, thus a strain will be produced between said surface layer in which the coagulation is quick and said interior in which the penetration of water is slow. Therefore, finally, local and nonuniform large voids will be likely to be formed in said interior, and as a whole the resulting sheet would have no desired moisture-permeability and softness. Further, in the same patent, it is mentioned that, if the applied layer is exposed to a moisture prior to its coagulation before it is treated with a nonsolvent, the pores in the resulting porous layer will remain to be of a diameter of less than 20 microns and the various desirable properties will not be obtained. Further, in said patent, it is also mentioned that, in a certain example, the room temperature during the coating operation with a polyurethane solution was 21°C. and the relative humidity was 20 percent and that a higher humidity will cause faster coagulation and must be avoided in order to produce a desirable cellular structure. However, it would be difficult to maintain such structly controlled atmospheric condition between the coating step and the coagulating step in the actual industrial practice.

There is further mentioned in said patent a process wherein a "colloid solution" prepared by adding to a polyurethane solution a proper amount of such nonsolvent for the polyurethane as water or methanol is applied on a substrate and coagulated. However, in fact the proper amount of the nonsolvent is difficult to determine because it is so different depending on the condition of the addition, the polymerization degree and composition of the polymer. Further, there are additional difficulties that the local coagulation and gelling of the polymer solution will occur unless very careful attention is paid in adding the non-solvent.

I have found that when a solution of a polyurethane dissolved in a water-miscible organic solvent and to which is added at least one inorganic salt selected from the group consisting of sodium sulfate, sodium chloride, potassium chloride and potassium sulfate is applied on at least one surface of a fibrous substrate or a film making plate, and is coagulated and regenerated with water or an aqueous solution of the above mentioned inorganic salt and, is washed with water and dried, there is obtained a porous sheet material with satisfactory porous structure in which fine pores and large pores are uniformly formed and distributed. The porous sheet is light and tough and is high in the moisture-permeability and softness. When the surface layer of said porous sheet is ground or subjected to buffing, a suede-leathery sheet material excellent in the appearance, hand and moisture-permeability is obtained.

I have found that the velocity of the coagulation and regeneration of a polyurethane may be controlled by carrying the coagulation in an aqueous system in the presence of an inorganic salt. Particularly the inorganic salt to be used in the present invention has advantages that its coagulation control activity is moderate, that it is cheap and is readily available, that it is a neutral salt so that it is inert not only to the polyurethane but also to the solvent and additive, and that it is so easily water-soluble that it can be easily removed from the resulting solid material.

It has also been found that the presence of said inorganic salt only in the coagulating or regenerating bath would result only in a delay of the coagulation and regeneration, and no porous sheet will be obtained.

Thus, in order to obtain a uniform and soft porous sheet material useful for synthetic leathers, it is essential to disperse or contain fine particles of said inorganic salt in the polyurethane resin solution.

While not ascertained, the working operating mechanism of the fine powdery inorganic salt in the polyurethane resin solution would be as follows. That is to say, in the process in which the water-miscible organic solvent (for example, dimethyl formamide) is replaced with water or an aqueous solution of said inorganic salt so that the coagulation and regeneration of the polyurethane may progress to give a film, there will partly be formed a concentrated solution of said inorganic salt in the interior of the coating layer and accordingly the coagulation and regeneration of this part will be particularly delayed. Therefore, as the solvent is removed due to replacement with the aqueous medium, a local shrinkage will occur within the film of the polyurethane and voids will be produced. In view of the fact that, when the cross-section of a porous sheet produced by the process of the present invention is microscopically observed, it will be found that the average diameter of the formed pore is always larger than the average diameter of the particle of said salt and that the difference between them reaches several tens percent or is sometimes several times as large, it is evident not only that, as said inorganic salt is water soluble, a trace of it has dissolved out of the film but also that the effect of enlarging the pore diameter by the action of said inorganic salt to delay the coagulation and regeneration of the polyurethane remarkably contributes. Therefore, the present invention is basically different from such known process of merely mixing an extractable substance with a film forming polymer and then extracting it after the formation of a film as is already suggested, for example, in the process for producing nylon leathers.

The features, among others, of the present invention may be enumerated as follows:

1. By varying the granularity (particle size) and mixing rate of said inorganic salt to be added to the polyurethane solution and, if desired, by varying the concentration of the inorganic salt in the coagulating bath, it is possible to control over a wide range the pore diameter and the porosity of the resulting sheet material. Therefore, the hand and softness of the sheet material can be also properly varied as desired.

2. Since it is not necessary to add a nonsolvent such as water or alcohol or hygroscopic salt such as calcium chloride or calcium nitrate to the polyurethane solution, there will be no fear of causing the viscosity rise and gelling of said solution between the coating step and the coagulating step even if any moisture is absorbed in the solution. Thus, the process can be carried out easily and smoothly even in an atmosphere of a high humidity.

3. For the coagulating bath can be used an aqueous solution of said inorganic salt of a concentration in a wide range. In the coagulating bath, the polyurethane solution film will comparatively quickly form a coagulated structure without causing a shrinkage or deformation. Further, in the subsequent water-washing step, the salt and solvent can be easily removed.

4. The inorganic salt to be used is inexpensive so that there is no problem in the economy. Further, the inorganic salt is neutral is therefore chemically inert and has no fear at all of inducing a hydrolysis as in an alkaline salt or acid salt. Further, there is an advantage that the solvent can be recovered easily and smoothly.

5. In the process of the present invention, the operation can be simpler than in any conventional process and there can be industrially easily and smoothly produced a porous sheet which has a peculiar porous structure in which fine pores and large pores are uniformly distributed. The resulting sheet is light and tough and is high in the moisture-permeability, softness and hand. Further, by properly grinding or buffing the surface layer of the porous sheet, there can be produced a suede-leathery sheet material excellent in the appearance, hand and moisture-permeability.

The polyurethanes to be used in the present invention include all conventionally used as polyurethane elastomers. Generally, an organic diisocyanate and a polyalkylene ether glycol or a polyester having hydroxyl groups at the terminals are reacted with each other to produce a prepolymer and this prepolymer is subjected to a chain extending reaction with a chain-extender such as a diamine, diol or polyol, to form a polyurethane elastomer.

Examples of organic diisocyanates are aromatic, aliphatic and alicyclic diisocyanates, for example, toluylene 2,4 diisocyanate, toluylene 2,6 diisocyanate, diphenylmethane 4,4-diisocyanate, 1,5 naphthylene diisocyanate, hexamethylene diisocyanate, para-xylene diisocyanate, etc.

Examples of polyalkylene ether glycols are polyethylene ether glycol, polypropylene ether glycol, polytetramethylene ether glycol and polyhexamethylene ether glycol and their copolymers and mixtures. Further, for the polyols may be used glycerin and trimethylol propane.

The polyesters to be used are polycondensation products of organic acids and glycols. Preferable glycols are polyalkylene glycols such as ethylene glycol, propylene glycol, tetramethylene glycol and hexamethylene glycol; cyclic glycols such as cyclohexane diol; and aromatic glycols such as xylylene glycol. As for the acids, there may be used, for example, succinic acid, adipic acid, sebacic acid and terephthalic acid.

Examples of the chain-extenders to be used are diamines such as hydrazine, ethylene diamine and methylene diorthochloraniline.

For the catalysts, there may be used triethylamine, triethylene diamine, N-ethyl morpholine, dibutyl tin dilaurate and cobalt naphthenate.

The polyester having terminal hydroxyl groups may be obtained by ring-opening-polymerizing a lactone in the presence of a small amount of a glycol or by polycondensing an excess diol with a dicarboxylic acid. Preferably an average molecular weight of such polyester is about 500 to 3,000. For the lactone, there may be used, for example, δ-valerolactone, γ-butyrolactone and ε-caprolactone.

Since these polyurethanes are well known per se in the art no further details thereabout will be necessary.

The polyurethane thus prepared is dissolved in a water-miscible organic solvent. If desired, a small amount of other film forming polymer(s) soluble in said solvent, for example, polyvinyl chloride, polyvinyl alcohol, polyacrylonitrile, polyacrylic ester or polyacrylic acid may be added to the solution.

It is essential that the solvent should be able to be extracted with water or an aqueous solution of said inorganic salt. Therefore, a water miscible organic solvent must be used. Examples of the solvent are N,N'-dimethyl formamide, dimethyl sulfoxide, tetrahydrofuran, tetramethyl urea, N,N'-dimethyl acetamide, dioxane and butyl carbinol. A mixture of two or more of them may also be used. Further, ketones (e.g. acetone, methyl ethyl ketone, etc.) which are not good solvents for polyurethanes as alone but are well miscible with their solutions may be used as a diluent in a range not coagulating said polymer.

The polyurethane solution to be used in the present invention is a viscous solution containing the above mentioned polyurethane elastomer and said inorganic salt. If desired, the solution may further contain a coloring agent (dye or pigment), light stabilizer, antistatic agent, dispersing agent, reinforcing agent (such as talc) and other additive. The coating solution may be prepared by dissolving the polyurethane elastomer in said organic solvent and adding the inorganic salt and other additives to the solution, or by dissolving a mixture of the polyurethane elastomer and said inorganic salt and other additives directly to the organic solvent.

The amount of the polyurethane elastomer to be contained in said solution may vary depending on the polymerization degree and chemical structure. However, the concentration is within such range that the solution as added with said inorganic salt will be stable for a long period of time at a temperature below 30°C. and will be easily applied to a fibrous substrate or film making plate. Generally, the viscosity of the coating polymer solution is in the range of about 5,000 to 100,000 centipoises. The amount of the polymer (concentration of the solution) is in the range of 5 to 40 percent by weight, preferably 15 to 35 percent by weight on said solution. If below 10 percent, the coagulating velocity will reduce and the properties of the resulting film will be likely to deteriorate. Above 40 percent, the viscosity will be so high that the coating operation will be difficult and the quality of the resulting film will be likely to deteriorate.

The amount of said inorganic salt to be dispersed in said polymer solution varies depending on the concentration of the polyurethane elastomer in the coating solution and also on the kind and concentration of said salt which may present in the coagulating bath, but is generally in the range of 5 to 100 percent by weight, preferably 10 to 50 percent by weight based on the polyurethane. If the amount is less than 5 percent, the coagulating velocity will be unduly high so that the moisture-permeability of the microporous film will reduce. Further, above 100 percent by weight, the quality of the film will remarkably reduce.

The inorganic salt is selected from a group consisting of sodium chloride, potassium chloride, sodium sulfate and potassium sulfate. A mixture of two or more of these salts may also be employed. These inorganic salts are nonhygroscopic but are easily soluble in water so that they are dissolved and removed in the coagulating bath and/or water-washing bath.

In using the inorganic salt, a required amount of the salt as dried and in the form of fine powder is added to the polyurethane solution and is stirred and mixed until it is uniformly dispersed therein. The granularity of said inorganic salt powder is preferable to be above 150 meshes, more preferably above 200 meshes. When the particles of said inorganic salt are unduly large, it will be difficult to keep the homogenuity of the coating polyurethane solution for a long time and it will be difficult to obtain a uniform porous material therefrom.

The polyurethane solution (coating solution) prepared by mixing and dispersing said inorganic salt (and other additives if used) is applied to a suitable base or substrate such as woven fabric, knit fabric, nonwoven fabric, sponge or paper, or to a film making plate such as glass plate, metal plate or plastics plate, by knife-coating, roller-coating or spraying.

The base material with a coating thereon is brought into contact with a coagulating bath.

Since it is not necessary at all to add to the polyurethane solution such nonsolvent as water or alcohol and such hygroscopic salt as calcium chloride or calcium nitrate, there will be no danger of the viscosity rise or gelling of said solution between the coating step and the coagulating step, even if any moisture is absorbed by the solution. Therefore, even in an atmosphere of a high humidity, the coating and subsequent operations can be easily carried out. Particularly, it is not necessary at all to so strictly adjust and control the atmosphere (relative humidity and temperature) during the coating and subsequent operations as in the process disclosed in Belgian Patent No. 636,018.

For the coagulating bath, there may be used water or an aqueous solution of an inorganic salt selected from the group consisting of sodium sulfate, sodium chloride, potassium sulfate and potassium chloride. The concentration of said inorganic salt in the coagulating bath varies depending on the kind of the salt, the amount of the inorganic salt in the polyurethane solution and the concentration of the polyurethane solution, but is generally below the amount (by weight) corresponding to two-thirds the concentration of the saturated aqueous solution concentration or preferably below the amount corresponding to one-third saturation. At such high concentration as above two-thirds saturation, the coagulating velocity of the polyurethane solution film will be reduced so much that the coagulated and produced film will form a too compact structure and therefore it will be difficult to obtain a desired porous sheet.

The temperature of the coagulating bath may be in the range of 5° to 50°C., preferably 20° to 40°C.

The features of the coagulating bath in the process of the present invention are that said inorganic salt to be used is cheap so that the bath is very economically advantageous, that, in case the bath is continuously used for a long period of time, even if a large amount of N,N'-dimethyl formamide is accumulated in said bath, the coagulating performance will not be influenced and that, due also to the peculiar coagulating regenerating action with said inorganic salt present in the polyurethane solution, there can be formed a porous sheet having excellent properties.

Further, the inorganic salt in the coagulating bath is chemically inert to such solvent as N,N'-dimethyl formamide so that there is no danger of inducing a hydrolysis, and the solvent can be recovered easily.

It is desirable and convenient that the coagulating bath temperature is near the normal or room temperature. However, in some cases, the temperature may be varied so that the coagulating activity of the salt solution may be varies. Generally, at the same salt concentration, there is a tendency that, the lower the temperature, the lower the coagulating activity will be and that, the higher the temperature, the higher the coagulating velocity will be. However, the temperature range showing a favorable coagulation and regeneration is sufficiently wide so that there would be no difficulty in selecting the bath temperature.

The base material or a film making plate on which has been applied the coating solution in a desired thickness is dipped for a predetermined time in the coagulating bath so as to coagulate and regenerate the polymer. The material is then washed with water to remove the salt and water-miscible organic solvent remaining in the regenerated film. The material is then dried.

When the coating polymer solution is applied on the surface of a film making plate such as a glass plate, metal plate or plastics plate and is coagulated and regenerated thereon, the resulting film having a porous structure will be formed as bonded and laminated on said plate. Therefore, it is water-washed and dried and the film is then peeled off. Such film is tough and light and is high in the softness and moisture-permeability.

When the coating polymer solution is applied to a fibrous base suitable for synthetic leathers, the resulting material will be able to be employed as a man-made leather.

When the compact surface portion of the porous layer bonded and laminated on the base fabric is subjected to buffing with a leather buffing apparatus fitted with a grinding paper coated with silica, emery, aluminum oxide, silicon carbide or the like, there will be obtained a suede-leathery sheet material excellent in the appearance, hand and moisture-permeability.

When the cross-section of the resulting porous layer made by coating one or both surfaces of such base as a glass plate, metal plate, plastics plate, film or the like, and subjecting to the above mentioned treatment, is microscopically examined, there are observed (1) comparatively large conical pores of a diameter of 50 to 100 microns substantially vertical to the sheet surface, (2) fine pores of a diameter of 5 to 50 microns and (3) micropores uniformly distributed throughout the porous layer. By this special pore characteristics, a tough, light, highly soft and highly moisture-permeable structure is obtained.

Further, in case a base fabric (e.g. woven fabric) having such clearances as will pass water is coated on one surface with the polymer solution and is dipped in a coagulating bath, the coagulating medium will coagulate the surface of the coating layer and will at the same time penetrate also through the back surface of the base fabric and coagulate the layer also from below. Therefore, when the state of pores in the resulting porous layer is microscopically examined, there are observed, (1) comparatively large spherical pores of a diameter of 100 to 300 microns, (2) conical pores of an average diameter of 50 to 100 microns substantially vertical to the sheet surface, (3) fine pores of a diameter of 5 to 50 microns and (4) micropores uniformly distributed throughout the layer. By this pore characteristics a light, tough, highly soft and highly moisture-permeable product is obtained.

The porous sheet material obtained by the present invention is useful for surface leathers of room interior decorations, packages, hand bags, gloves, boots and shoes and for clothes. The suede-leathery sheet is useful for upper leathers of shoes, jackets and other coats, decorative leather-lined trunks and covers of tables and rolls.

The following Examples illustrate the invention. In these Examples, the breaking strength and elongation were measured in respect of a sample with a width of 2 cm., length of 5 cm. and tensioning velocity of 3 cm./min. with Instron Tester. The moisture-permeability was determined by the method of JIS–6429. Further, the surface wear was measured by the method of JIS–L 1048–59.

EXAMPLE 1

One hundred and five parts of a polyethylene adipate having terminal OH groups and an average molecular weight of 1,050 were dissolved in 200 parts of anhydrous dioxane. Then 40.0 parts of methylene bis(4-phenyl isocyanate) were added thereto and the solution was kept at 80°C. for 2 hours in a nitrogen atmosphere and was then cooled to 30°C. Then, into the thus obtained N—NCO active prepolymer were added at a time 3.7 parts of ethylene glycol and 0.02 part of triethylene diamine together with 100 parts of anhydrous dioxane to carry out a chain-extending reaction. The system was kept for 3 hours to complete the reaction. Then the polymer solution was cooled and poured into water to remove a greater part of the dioxane. The separated polymer was then dried at 80°C. under a reduced pressure. The polymer was dissolved into N,N'-dimethyl formamide so as to be of a concentration of 30 percent by weight. The viscosity of the polymer solution was 45,000 centipoises.

Then, into this polymer solution, there were added sodium sulfate of 200 meshes and sodium chloride of 200 meshes in various amounts as shown in the following table. This solution was applied by knife-coating onto a glass plate so as to be 1.0 mm. thick and was introduced into a coagulating bath at 20°C. for 20 minutes so as to perfectly coagulate and regenerate. The plate with the film was washed with warm water (40°C.) to well remove the sodium sulfate or sodium chloride and N,N'-dimethyl formamide remaining on the film and was then air-dried at 100°C. for 5 minutes.

As a result of observing the cross-sectioned structure of the thus obtained regenerated polyurethane films and measuring the strength, elongation and moisture-permeability, it was found that, when 5 to 100 parts of sodium sulfate or sodium chloride were added per 100 parts of the polyurethane elastomer, there was observed a porous structure in which conical pores of an average diameter of 50 to 100 microns, small spherical pores of a diameter of 5 to 50 microns and micropores are uniformly distributed and that the film was very high in the moisture-permeability and softness and was tough.

Further, the films made under the same conditions except that no sodium sulfate was added to the polyurethane elastomer and the films made by adding 100 percent calcium chloride or calcium nitrate instead of sodium sulfate in respect of the polymer were all lower in the porosity and higher in the specific gravity. Further, during the coating operation, the solutions gelled partly by absorbing moisture and the coating operation was difficult.

When potassium sulfate and potassium chloride were used instead of sodium sulfate and sodium chloride, the same tendency was observed and porous films high in the quality could be easily obtained again.

| Polymer concentration percent | Salt added | Amount of salt per 100 parts polymer | Cross-section of film | Thickness (mm.) | Specific gravity | Strength, kg./mm.² | Elongation, percent | Moisture permeability mg./cm.²/hr |
|---|---|---|---|---|---|---|---|---|
| 30 | None | 0 | Non-uniform voids | 0.66 | 0.52 | 0.66 | 432 | 5.3 |
| 25 | do | 0 | do | 0.64 | 0.51 | 0.63 | 405 | 6.0 |
| 30 | Anhydrous sodium sulfate | 5 | Porous | 0.68 | 0.47 | 0.59 | 378 | 9.5 |
| 25 | do | 5 | do | 0.66 | 0.40 | 0.54 | 353 | 10.6 |
| 30 | do | 10 | do | 0.72 | 0.38 | 0.53 | 367 | 13.2 |
| 25 | do | 10 | do | 0.70 | 0.33 | 0.49 | 364 | 14.3 |
| 30 | do | 30 | do | 0.73 | 0.34 | 0.51 | 353 | 15.4 |
| 25 | do | 30 | do | 0.71 | 0.32 | 0.44 | 342 | 15.2 |
| 30 | do | 100 | do | 0.72 | 0.34 | 0.47 | 324 | 16.3 |
| 25 | do | 100 | do | 0.67 | 0.31 | 0.34 | 309 | 17.3 |
| 30 | do | 110 | do | 0.74 | 0.29 | 0.27 | 310 | 23.2 |
| 25 | do | 110 | do | 0.68 | 0.29 | 0.25 | 285 | 24.0 |
| 30 | Sodium chloride | 5 | do | 0.70 | 0.42 | 0.61 | 420 | 7.5 |
| 25 | do | 5 | do | 0.68 | 0.39 | 0.50 | 413 | 9.5 |
| 30 | do | 10 | do | 0.72 | 0.37 | 0.48 | 390 | 9.8 |
| 25 | do | 10 | do | 0.70 | 0.35 | 0.48 | 377 | 11.7 |
| 30 | do | 30 | do | 0.72 | 0.34 | 0.52 | 374 | 13.8 |
| 25 | do | 30 | do | 0.69 | 0.31 | 0.47 | 353 | 13.9 |
| 30 | do | 100 | do | 0.74 | 0.33 | 0.49 | 323 | 12.9 |
| 25 | do | 100 | do | 0.71 | 0.30 | 0.38 | 324 | 15.6 |
| 30 | do | 110 | do | 0.73 | 0.29 | 0.25 | 310 | 19.3 |
| 25 | do | 110 | do | 0.72 | 0.28 | 0.23 | 265 | 20.3 |
| 30 | Anhydrous calcium chloride | 10 | Voids | 0.68 | 0.51 | 0.62 | 442 | 6.4 |
| 25 | do | 10 | do | 0.66 | 0.49 | 0.59 | 423 | 8.2 |
| 30 | Anhydrous calcium nitrate | 10 | do | 0.69 | 0.51 | 0.53 | 416 | 7.6 |
| 25 | do | 10 | do | 0.67 | 0.48 | 0.61 | 385 | 8.1 |

EXAMPLE 2

One hundred parts of the polyurethane elastomer produced in Example 1 were dissolved into N,N'-dimethyl formamide so as to be of a concentration of 30 percent. Then 10 parts of sodium chloride or sodium sulfate per 100 parts of the polyurethane were added therein and the solution was applied on a glass plate so as to be 1.0 mm. thick. The plate with a coating solution thereon was dipped into a coagulating bath consisting of an aqueous solution of 10 or 20 percent sodium chloride or sodium sulfate as in the following table and, at 30°C. for 30 minutes. The glass plate with a film thereon was then transferred into water at 60°C. The coagulated film was peeled off, well washed with water and then dried in hot air of 105°C. for 5 minutes. The properties of the film were as follows. In comparison, the results where the same procedures were repeated except that no salt was added to the solution of the polyurethane elastomer are also indicated.

As apparent from the results in the following table, a tough porous film high in the softness and moisture-permeability was formed when the salt was added to the coagulating bath. However, when the amount of the salt was increased the porosity tended to somewhat reduce. (The specific gravity slightly increased.) However, when no salt was added to the polyurethane elastomer solution, the specific gravity was high, the structure was compact and the moisture-permeability was somewhat low.

When potassium sulfate or potassium chloride was used instead of sodium sulfate or sodium chloride, the same tendency was observed, and an excellent porous sheet was produced.

EXAMPLE 3

N,N'-dimethylformamide was added to an N,N'-dimethylformamide solution (35 percent) of ester type polyurethane (Crysbon, product of Japan Reichhold Company) so that the resin concentration becomes 30 percent by weight. A fine powder of sodium sulfate (200 meshes) in an amount of 30 percent on the weight of the resin and carbon black in an amount of 3 percent were added thereto and were well mixed. The thus prepared polyurethane elastomer solution (viscosity 55,000 centipoises at 25°C.) was applied to coat a polyester-cotton broadcloth so as to be 1 mm. thick. The coated fabric was passed between rolls and then was introduced at an angle of 60° into a coagulating bath of water at a temperature of 20°C. for 20 minutes. The water of the coagulating bath penetrated through the back surface of the broadcloth and the surface of the coating layer to coagulate and regenerate the same. Then the cloth was treated in bot water at 80°C. for 20 minutes and then dried in a dryer. The resulting porous sheet had a porous structure consisting of large spherical pores of a diameter of 100 to 300 microns, conical pores of an average diameter of 50 to 100 microns substantially vertical to the sheet surface, fine pores of diameter of 5 to 50 microns and micropores. The density was 0.50 g./cm³ and the tensile strength was 1.3 kg./cm². No change in the surface wear was observed even after 1,000 times.

EXAMPLE 4

An elastomer solution of a viscosity of 20,000 centipoises prepared by adding to a 25 percent N,N'-

| Polymer concentration, percent | Amount of salt per 100 parts of polymer | Salt in coagulating bath (g.l.) | Structure of film | Thickness (mm.) | Specific gravity | Strength, kg./mm.² | Elongation, percent | Moisture permeability, mg./cm.²/hr |
|---|---|---|---|---|---|---|---|---|
| 30 | 0 | 100, NaCl | Compact | 0.59 | 0.60 | 0.61 | 436 | 6.5 |
| 30 | 0 | 200, NaCl | do | 0.51 | 0.61 | 0.69 | 452 | 5.1 |
| 30 | 10, NaCl | 100, NaCl | Porous | 0.71 | 0.39 | 0.53 | 364 | 13.6 |
| 30 | 10, NaCl | 200, NaCl | do | 0.68 | 0.42 | 0.54 | 372 | 12.5 |
| 30 | 0 | 100, Na₂SO₄ | Compact | 0.59 | 0.59 | 0.64 | 397 | 5.8 |
| 30 | 0 | 200, Na₂SO₄ | do | 0.53 | 0.62 | 0.65 | 426 | 4.2 |
| 30 | 10, Na₂SO₄ | 100, Na₂SO₄ | Porous | 0.70 | 0.41 | 0.49 | 353 | 12.4 |
| 30 | 10, Na₂SO₄ | 200, Na₂SO₄ | do | 0.68 | 0.43 | 0.51 | 361 | 12.5 | dimethyl formamide solution of an ester type polyurethane a powder of sodium chloride (200 meshes) in an amount of 100 percent by weight based on the polyurethane elastomer was applied to coat a non-woven fabric (0.7 thick) so as to be 0.6 mm. thick and was coagulated and regenerated with warm water at 30°C. for 30 minutes. Then the fabric was treated with hot water at 60°C. for 30 minutes and was dried. The resulting porous layer was subjected to buffing in a thickness of 0.3 mm. with a sand paper. The thus produced porous layer had conical pores of an average diameter of 50 to 100 microns, fine spherical pores of a diameter of 5 to 50 microns and micropores. The average diameter of pores on the exposed surface was 15 microns. The density of the suedey sheet was 0.52 g./cm$^3$. Its tensile strength was 1.0 kg./cm$^2$, and moisture-permeability was 3 mg/cm$^2$/hr. Further, no change in the surface wear was observed even after 1,000 times. The sheet was useful for the production of suedey shoes.

EXAMPLE 5

A resin solution was prepared by adding to a 25 percent N,N'-dimethyl formamide solution of an ester type polyurethane a fine powder of sodium chloride (200 meshes) in an amount of 50 percent by weight based on the polyurethane and an organic pigment in an amount of 3 percent. Further a polyacrylic acid was added thereto in an amount of 5 percent by weight on the polyurethane so as to be of a viscosity of 80,000 centipoises at 25°C. The coating solution was applied to coat a mix-spun broadcloth of polyester fibers and cotton of 120 deniers so as to be 0.3 mm. thick. The wet cloth was passed for 10 minutes by guide rolls in warm water at 40°C., and then treated in a hot water bath at 100°C. for 10 minutes, and was dried. The thus obtained porous sheet was laminated to a non-woven fabric (1 mm. thick). The resulting material had a tensile strength of 1.5 kg./cm$^2$, elongation of 70 percent and moisture-permeability of 2 mg/cm$^2$/hr. and was useful for making shoes, bags and interior furnishings.

EXAMPLE 6

A solution prepared by adding to a 20 percent N,N'-dimethyl formamide solution of ester type polyurethane (Paraplane-22, product of Hodogaya Chemical Company) potassium sulfate (200 meshes) in an amount of 100 percent based on the resin and a pigment in an amount of 5 percent, was applied to coat the napped surface of a staple fiber flano texture so as to be 0.7 mm. thick. The material was subjected to coagulation in a 10 percent aqueous solution of sodium sulfate at 120°C. for 20 minutes. Then it was treated with hot water at 80°C. for 10 minutes and dried. Then the resin surface was buffed with a sand paper to produce suede-like or back skin-like material, which was useful for clothing.

What is claimed is:

1. A process for producing a porous sheet material which comprises (a) uniformly dispersing from about 10 to about 50 parts by weight of an inorganic salt in 100 parts by weight of a film-forming polyester type polyurethane, (b) applying the coating solution on a fibrous substrate or a film-making plate, (c) coagulating the coating layer with an aqueous coagulation medium comprising an aqueous solution of said inorganic salt, the concentration of said inorganic salt in said coagulating medium being below about two-thirds its concentration at saturation, and at least sufficient to yield a porous sheet upon coagulation of said polyurethane, said inorganic salt being selected from the group consisting of sodium sulfate, sodium chloride, potassium sulfate, potassium chloride and mixtures thereof.

2. The process as in claim 1, wherein the concentration of the inorganic salt in the coagulating medium is less than one-third of its concentration at saturation.

3. The process as in claim 1, wherein the temperature of the coagulating medium is 5°–50°C.

4. The process as in claim 1, wherein the temperature of the coagulating medium is 20°–40°C.

* * * * *

Notice of Adverse Decision in Interference

In Interference No. 98,728, involving Patent No. 3,714,307, T. Shikada, AQUEOUS COAGULATION OF SALT CONTAINING PONURETHANE TO FORM POROUS SHEET, final judgment adverse to the patentee was rendered Aug. 20, 1976, as to claims 1, 2, 3 and 4.

[*Official Gazette November 30, 1976.*]